United States Patent
Lee et al.

(10) Patent No.: US 9,454,037 B2
(45) Date of Patent: Sep. 27, 2016

(54) BACKLIGHT UNIT AND DISPLAY DEVICE HAVING THE SAME

(71) Applicant: Samsung Display Co., Ltd., Yongin, Gyeonggi-Do (KR)

(72) Inventors: Jaesang Lee, Asan-si (KR); Yong-Hwi Kim, Asan-si (KR); Luly Lee, Yongin-si (KR); Seongsik Choi, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 77 days.

(21) Appl. No.: 14/469,887

(22) Filed: Aug. 27, 2014

(65) Prior Publication Data

US 2015/0253623 A1 Sep. 10, 2015

(30) Foreign Application Priority Data

Mar. 6, 2014 (KR) .................. 10-2014-0026672

(51) Int. Cl.
*G02F 1/1335* (2006.01)
*G02F 1/1333* (2006.01)

(52) U.S. Cl.
CPC ... *G02F 1/133603* (2013.01); *G02F 1/133305* (2013.01); *G02F 1/133504* (2013.01); *G02F 1/133606* (2013.01)

(58) Field of Classification Search
None
See application file for complete search history.

(56) References Cited

U.S. PATENT DOCUMENTS

| 7,826,006 | B2 | 11/2010 | Koganezawa | |
|---|---|---|---|---|
| 7,903,196 | B2 | 3/2011 | Koganezawa | |
| 2009/0059563 | A1 | 3/2009 | Takata et al. | |
| 2012/0320323 | A1 | 12/2012 | Kim et al. | |
| 2013/0180653 | A1 | 7/2013 | Kim et al. | |
| 2014/0009914 | A1* | 1/2014 | Cho | G09F 9/35 362/97.3 |
| 2014/0078720 | A1* | 3/2014 | An | G02F 1/133603 362/97.1 |
| 2014/0092356 | A1* | 4/2014 | Ahn | G02F 1/1339 349/153 |
| 2014/0111974 | A1* | 4/2014 | Choi | G09F 9/30 362/97.1 |
| 2015/0163896 | A1* | 6/2015 | Kim | G02F 1/133308 361/749 |
| 2015/0285467 | A1* | 10/2015 | Choi | G09F 13/00 362/97.1 |

FOREIGN PATENT DOCUMENTS

| JP | 2008089884 A | 4/2008 |
|---|---|---|
| JP | 2009093000 A | 4/2009 |
| JP | 2009175600 A | 8/2009 |
| JP | 2010002486 A | 1/2010 |
| KR | 1020070118498 A | 12/2007 |

\* cited by examiner

*Primary Examiner* — Ashok Patel
(74) *Attorney, Agent, or Firm* — Cantor Colburn LLP (57) ABSTRACT

A display device includes a display panel and a backlight unit. The display panel is curved along a first direction. The backlight unit includes an upper surface, and a lower surface having a curvature different from a curvature of the upper surface. The backlight unit includes a bottom cover that includes a bottom portion, and a sidewall extending from the bottom portion, a plurality of light emitting diodes on the bottom portion and generating light, and a diffusion plate on the light emitting diodes. In the first direction from a center portion of the bottom portion to an outer portion of the bottom portion, pitches between the light emitting diodes along a surface of the bottom portion, are proportional to distances between the light emitting diodes and the diffusion plate in a direction substantially normal to positions of the bottom portion at which the light emitting diodes are disposed.

18 Claims, 6 Drawing Sheets

BACKLIGHT UNIT AND DISPLAY DEVICE HAVING THE SAME

This application claims priority to Korean Patent Application No. 10-2014-0026672, filed on Mar. 6, 2014, and all the benefit accruing therefrom under 35 U.S.C. §119, the contents of which are hereby incorporated by reference in its entirety.

BACKGROUND

1. Field

The invention relates to a backlight unit and a display device having the same. More particularly, the invention relates to a backlight unit and a curved display device having the backlight unit.

2. Description of the Related Art

A non-light emission display device, such as a liquid crystal display device, an electrophoretic display device, an electrowetting display device, etc., requires a backlight assembly to generate light.

The backlight assembly is classified into an edge-illumination type backlight assembly and a direct-illumination type backlight assembly according to a position of light source with respect to a display screen of the display device through which an image is displayed.

The direct-illumination type backlight assembly is manufactured at a relatively low cost compared to that of the edge-illumination type backlight assembly since the direct-illumination type backlight assembly does not include a light guide plate and a heat-discharge member, which are applied to the edge-type backlight assembly. In addition, the direct-illumination type backlight assembly has a small light loss when compared to that of the edge-illumination type backlight assembly, and thus brightness of the direct-illumination type backlight assembly is higher than that of the edge-illumination type backlight assembly even though the direct-illumination type backlight assembly and the edge-illumination type backlight assembly are applied with the same voltage.

In order to improve a viewing angle, demand for a liquid crystal display having curved shape keeps on increasing in various fields.

SUMMARY

One or more exemplary embodiment of the invention provides a backlight unit capable of reducing a manufacturing cost thereof and having a relatively slim size.

One or more exemplary embodiment of the invention provides a display device having the backlight unit.

An exemplary embodiment of the invention provides a display device including a display panel and a backlight unit. The display panel is configured to display an image and is curved along a first direction. The backlight unit provides a light to the display panel and includes upper and lower surfaces having different curvatures from each other.

The backlight unit includes a bottom cover which includes a bottom portion curved along the first direction, and a sidewall extending from the bottom portion, a plurality of light emitting diodes on the bottom portion, and a diffusion plate on the light emitting diodes and curved along the first direction.

In the first direction from a center portion of the bottom portion to an outer portion of the bottom portion, pitches between the light emitting diodes along a surface of the bottom portion, are proportional to distances between the light emitting diodes and the diffusion plate in a direction substantially normal to positions of the bottom portion at which the light emitting diodes are disposed.

The bottom portion may have a curvature different from a curvature of the diffusion plate.

The light emitting diodes may include a center light emitting diode at the center portion of the bottom portion in the first direction, and an outer light emitting diode at the outer portion of the bottom portion in the first direction.

The curvature of the bottom portion may be larger than the curvature of the diffusion plate.

The distance between the center light emitting diode and the diffusion plate in the direction substantially normal to the position of the bottom portion at which the center light emitting diode is disposed, may be greater than the distance between the outer light emitting diode and the diffusion plate in the direction substantially normal to the position of the bottom portion at which the outer light emitting diode is disposed.

The pitch in the first direction between the center light emitting diode and the light emitting diode adjacent to the center light emitting diode may be greater than the pitch in the first direction between the outer light emitting diode and the light emitting diode adjacent to the outer light emitting diode.

An amount of light emitted from the center light emitting diode in a unit of time may be greater than an amount of light emitted from the outer light emitting diode in the unit of time.

The curvature of the bottom portion may be smaller than the curvature of the diffusion plate.

The distance between the center light emitting diode and the diffusion plate in the direction substantially normal to the position of the bottom portion at which the center light emitting diode is disposed, may be smaller than the distance between the outer light emitting diode and the diffusion plate in the direction substantially normal to the position of the bottom portion at which the outer light emitting diode is disposed.

The pitch in the first direction between the center light emitting diode and the light emitting diode adjacent to the center light emitting diode may be smaller than the pitch in the first direction between the outer light emitting diode and the light emitting diode adjacent to the outer light emitting diode.

An amount of light emitted from the center light emitting diode in unit time may be smaller than an amount of light emitted from the outer light emitting diode in the unit time.

According to one or more exemplary embodiment, a manufacturing cost of the backlight unit and the display device may be reduced and a thickness of the display device may be decreased.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
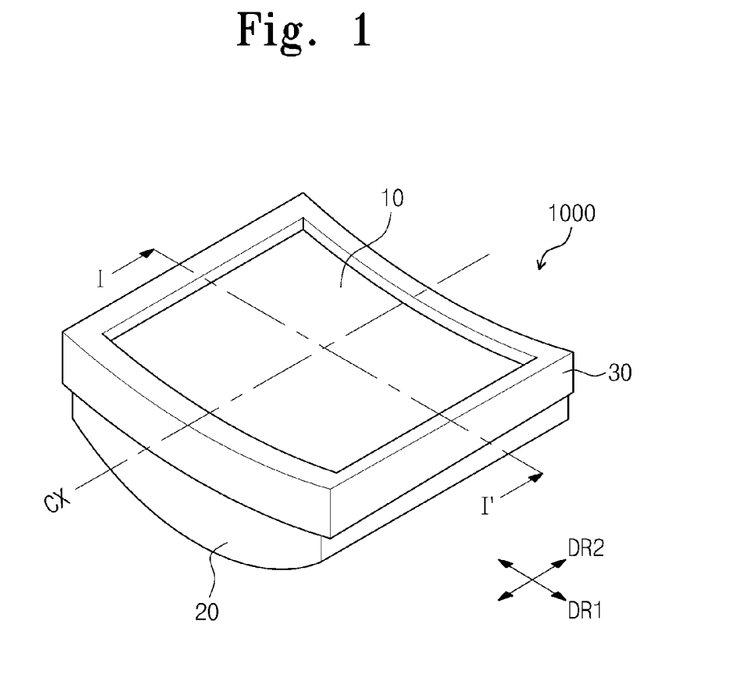
FIG. 1 is a perspective view showing an exemplary embodiment of a display device according to the invention.
Figure 2:
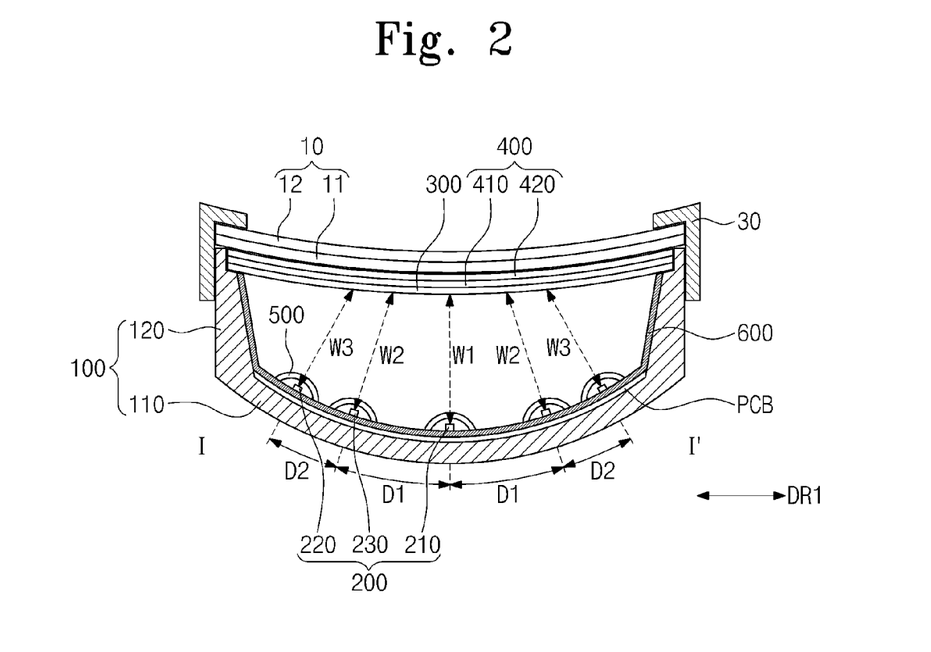
FIG. 2 is a cross-sectional view taken along line I-I' shown in FIG. 1.
Figure 3:
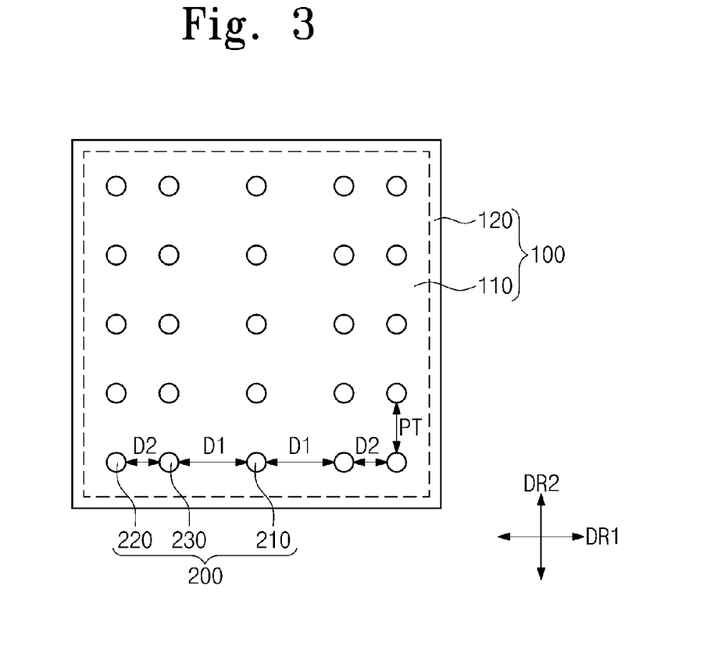
FIG. 3 is a plan view showing an exemplary embodiment of a light emitting diode and a bottom cover of a backlight unit shown in FIG. 1.

FIG. 1 is a perspective view showing an exemplary embodiment of a display device 1000 according to the invention, FIG. 2 is a cross-sectional view taken along line I-I' shown in FIG. 1, and FIG. 3 is a plan view showing an exemplary embodiment of a light emitting diode and a bottom cover of a backlight unit shown in FIG. 1.

Referring to FIGS. 1 to 3, the display device 1000 includes a display panel 10, an upper cover 30, and a backlight unit 20.

The display panel 10 is configured to display an image. The display panel 10 includes a non-light emission display panel for which a separate light source is used, rather than a self-emissive display panel, e.g., an organic light emitting display panel. The display panel 10 may include various non-light emission display panels, but hereinafter, a liquid crystal display panel will be described as the display panel 10.

The display panel 10 includes a first substrate 11, a second substrate 12 facing the first substrate 11, and a liquid crystal layer (not shown) disposed between the first substrate 11 and the second substrate 12. The liquid crystal layer includes liquid crystal molecules, in which an alignment thereof is changed in response to an electric field formed between the first substrate 11 and the second substrate 12.

Although not shown in figures, the display device 1000 further includes a pair of polarizing plates (not shown) respectively disposed on upper and lower portions of the display panel 10.

The display panel 10 has a rectangular plate shape, and two sides adjacent to each other of the display panel 10 extend in a first direction DR1 and a second direction DR2, respectively.

The display panel 10 is curved along the first direction DR1. The display panel 10 is curved to be symmetrical with respect to a center axis CX that extends in the second direction DR2 and crosses a center of the display panel 10.

The display panel 10 is curved to be concaved as seen in the second direction DR2. The display panel 10 may be manufactured to be curved using the first and second substrates 11 and 12, which are curved, but the invention is not limited thereto or thereby. That is, the display panel 10 may include the first and second substrates 11 and 12, which are initially flat but include a flexible material. Where the first and second flexible substrates are initially flat, the first and second substrates 11 and 12 are coupled to each other and curved by using the upper cover 30, which is rigid but curved.

The upper cover 30 covers an edge of the display panel 10 and is coupled to the display panel 10 and the backlight unit 20. The upper cover 30 is provided with an opening disposed therethrough to expose a portion of the upper surface of the display panel 10.

The backlight unit 20 is disposed under the display panel 10 to provide a light to the display panel 10. The backlight unit 20 includes an upper surface and a lower surface, which have different curvatures from each other.

The backlight unit 20 includes a bottom cover 100, a light generator such as a plurality of light emitting diodes 200, a diffusion plate 300, an optical sheet 400 and a plurality of optical lenses 500.

The bottom cover 100 includes a receiving space defined therein and the light emitting diodes 200 and the optical lenses 500 are accommodated in the receiving space.

The bottom cover 100 includes a bottom portion 110, and a sidewall 120 extending from an edge of the bottom portion 110.

The bottom portion 110 is curved to be concaved.

An outer surface of the sidewall 120 extends in a direction substantially vertical (e.g., normal) to the bottom portion 110 and an inner surface of the sidewall 120 extends in a direction inclined to the bottom portion 110. The inner surface 120 extending in the direction inclined to the bottom portion 110 improves a reflection efficiency of the light emitted from the light emitting diodes 200. However, although not shown in figures, the outer and inner surfaces of the sidewall 120 may both extend in the direction inclined to the bottom portion 110. The bottom portion 110 and the sidewall 120 may define the receiving space of the bottom cover 100.

The sidewall 120 includes a step portion defined at an upper end thereof. The diffusion plate 300 and the optical sheet 400 are placed on the step portion of the sidewall 120.

The light emitting diodes 200 are arranged on the bottom portion 110 and generate and emit the light such that the light travels at a predetermined angle.

The light emitting diodes 200 are arranged in the second direction DR2 at regular pitches PT, but the pitches PT in the first direction DR1 between the light emitting diodes 200 may be different from each other. The arrangement of the light emitting diodes 200 will be described in detail later.

The diffusion plate 300 is placed on the step portion of the sidewall 120. The diffusion plate 300 uniformly diffuses the light emitted from the light emitting diodes 200.

The diffusion plate 300 has a curvature different from that of the bottom portion 110. In the illustrated exemplary embodiment, the curvature of the bottom portion 110 is larger than the curvature of the diffusion plate 300. In addition, the diffusion plate 300 may have the same curvature as that of the display panel 10.

The optical sheet 400 is disposed between the diffusion plate 300 and the display panel 10.

The collective optical sheet 400 includes a light-condensing sheet 410 and a protection sheet 420. The light-condensing sheet 410 improves brightness of the light diffused by the diffusion plate 300. The protection sheet 420 protects the light-condensing sheet 410 and secures a viewing angle of the display panel 10. The collective optical sheet 400 shown in FIG. 2 includes two sheets, but the number of the sheets of the collective optical sheet 400 should not be limited to two.

The optical sheet 400 is curved to have the same curvature as that of the diffusion plate 300.

The optical lenses 500 cover the light emitting diodes 200, respectively. The optical lenses 500 improve an optical illumination angle of the light emitting diodes 200. The optical lenses 500 refract a portion of the light emitted from the light emitting diodes 200 such that the portion of the light becomes farther away from the direction substantially vertical to the bottom portion 110. Among the light emitted from the light emitting diodes 200, the light traveling in a direction other than the direction substantially vertical to the bottom portion 110 is refracted while passing through the optical lenses 500. Where the light traveling in the direction other than the direction substantially vertical to the bottom portion 110 is refracted, the light traveling in the direction substantially vertical to the bottom portion 110 travels in the direction substantially vertical to the bottom portion 110 without being refracted by the optical lenses 500. To this end, the optical lenses 500 include a material having a refractive index equal to or greater than 1 and include a transparent material.

In FIG. 2, each optical lens 500 has a hemi-spherical shape and a uniform thickness across the hemi-spherical shape to allow upper and lower surfaces thereof to have different curvature radiuses, but the invention is not limited thereto or thereby.

The optical lenses 500 are disposed on the same layer as the light emitting diodes 200, but the invention is not limited thereto or thereby. That is, the backlight unit 20 may further include a lens supporter (not shown) disposed on the bottom portion 110 and the optical lenses 500 may be supported by the lens supporter.

The backlight unit 20 further includes a printed circuit board PCB and a reflection plate 600.

The printed circuit board PCB is disposed between the light emitting diodes 200 and the bottom portion 110. The printed circuit board PCB applies a driving voltage to the light emitting diodes 200.

The reflection plate 600 is disposed between the light emitting diodes 200 and the printed circuit board PCB. In addition, the reflection plate 600 may be disposed on the inner surface of the sidewall 120. The reflection plate 600 reflects the light incident thereto.

The light emitting diodes 200 are configured to include a center light emitting diode 210 and an outer light emitting diode 220. The center light emitting diode 210 is disposed at a center portion of the bottom portion 110 in the first direction DR1. The outer light emitting diode 220 is disposed at an outer portion of the bottom portion 110 in the first direction DR1, and may be defined as an outermost one of the light emitting diodes 200 at a maximum distance from the center portion of the bottom portion 110 in the first direction DR1. The light emitting diodes 200 may be arranged in rows extending in the first direction DR1 and columns extending in the second direction DR2.

The light emitting diodes 200 may further include an intermediate light emitting diode 230 disposed between the center light emitting diode 210 and the outer light emitting diode 230. In FIG. 2 and FIG. 3, the intermediate light emitting diode 230 is arranged in one column, but the number of the columns in which the intermediate light emitting diode 230 is arranged should not be limited to one.

The pitch in the first direction DR1 between the light emitting diodes 200, which is measured along the surface of the bottom portion 110, is proportional to a distance between the diffusion plate 300 and the light emitting diodes 200 in the direction substantially vertical to the bottom portion 110.

Each of the center light emitting diode 210, the outer light emitting diode 220 and the intermediate light emitting diode 230 may be provided in plural (e.g., groups thereof) arranged in the second direction DR2 at regular intervals (e.g., PT).

A distance W1 between the center light emitting diode 210 and the diffusion plate 300 in the direction substantially vertical (e.g., normal) to the bottom portion 110 at which the center light emitting diode 210 is disposed, is larger than a width W3 between the outer light emitting diode 220 and the diffusion plate 300 in the direction substantially vertical (e.g., normal) to the bottom portion 110 at which the outer light emitting diode 210 is disposed.

The distance in the direction substantially vertical (e.g., normal) to the bottom portion 110 between the diffusion plate 300 and the light emitting diodes decreases, as a distance from the center light emitting diode 210 increases and a distance from the outer light emitting diode 220 decreases. In detail, the distance W1 between the center light emitting diode 210 and the diffusion plate 300 is larger than the distance W2 between the intermediate light emitting diode 230 and the diffusion plate 300, and the distance W2 between the intermediate light emitting diode 230 and the diffusion plate 300 is larger than the distance between the outer light emitting diode 220 and the diffusion plate 300, that is, W1>W2>W3.

A pitch D1 in the first direction DR1 between the center light emitting diode 210 and the light emitting diodes adjacent to the center light emitting diode 210, may be larger than a pitch D2 in the first direction DR1 between the outer light emitting diode 220 and the light emitting diodes adjacent to the outer light emitting diode 220.

The pitch between the light emitting diodes in the first direction DR1 decreases, as a distance from the center light emitting diode 210 increases and a distance from the outer light emitting diode 220 decreases. In more detail, the pitch D1 between the center light emitting diode 210 and the intermediate light emitting diode 230 may be larger than the pitch D2 between the outer light emitting diode 220 and the intermediate light emitting diode 230, that is, D1>D2.

As described above, since the pitch between the light emitting diodes 200 in the direction of curvature of the backlight unit 20 is proportional to the optical distance between the diffusion plate 300 and the light emitting diodes 200 in the display device 1000, the uniformity of the light generated by the backlight unit 20 may be uniformly maintained. Consequently, the number of the light emitting diodes may be adjusted by controlling the optical distance without exerting influence on the backlight unit 20.

In a display device according to a comparative example, the pitch between the light emitting diodes of the backlight unit is constant and the distance between the diffusion plate and the light emitting diodes is constant.

When the display device according to one or more exemplary embodiment of the invention is applied to a relatively low-price display device model, the distance between the diffusion plate 300 and the outer light emitting diode 220 is maintained at the same value as that of the display device according to the comparative example and the distance between the diffusion plate 300 and the center light emitting diode 210 is set larger than that of the display device according to the comparative example. For one or more of the exemplary embodiment according to the invention applied to the relatively low-price display device model, an average value of the pitches between the light emitting diodes 200 of the low-price display device model is larger than that of the pitches between the light emitting diodes of the display device according to the comparative example, and thus the number of the light emitting diodes may be decreased and the manufacturing cost of the display device may be reduced.

In addition, when the display device according to one or more of the exemplary embodiment is applied to a relatively slim display device model, the distance between the diffusion plate 300 and the center light emitting diode 210 is maintained at the same value as that of the display device according to the comparative example and the distance between the diffusion plate 300 and the outer light emitting diode 220 is set smaller than that of the display device according to the comparative example. For one or more of the exemplary embodiment according to the invention applied to the relatively slim display device model, although the number of the light emitting diodes 200 is equal to the number of the light emitting diodes of the display device according to the comparative example, an average thickness of the slim display device model may be thinner than that of the display device according to the comparative example.

A light amount of the light emitted from the center light emitting diode 210 in a unit of time may be greater than a light amount of the light emitted from the outer light emitting diode 220 in the unit of time.

The light amount of the light emitted from the light emitting diodes is decreased as the distance from the center light emitting diode 210 increases and the distance from the outer light emitting diode 220 decreases. In detail, the light amount L1 of the light emitted from the center light emitting diode 210 is greater than the light amount L2 of the light emitted from the intermediate light emitting diode 230, and the light amount L2 of the light emitted from the intermediate light emitting diode 230 is greater than the light amount L3 of the light emitted from the outer light emitting diode 220, that is, L1>L2>L3.

When the distance between the light emitting diodes 200 and the diffusion plate 300 varies, a brightness difference occurs. In order to allow the brightness to be uniform over the entire area of the backlight unit 20, the light amount of the light emitted from the light emitting diodes 200 is proportional to the distance between the light emitting diodes 200 and the diffusion plate 300.

In more detail, the printed circuit board PCB may control the light amount by controlling a duty ratio of the light emitting diodes 200, an electrical current level applied to the light emitting diodes 200, or an electrical current-on time of the electrical current applied to the light emitting diodes 200. In an exemplary embodiment, for instance, the printed circuit board PCB may control the light amount of the light emitted from the light emitting diodes 200 to allow the duty ratio of the center light emitting diode 210 to be relatively large and the duty ratio of the outer light emitting diode 220 to be relatively small.

Figure 4:
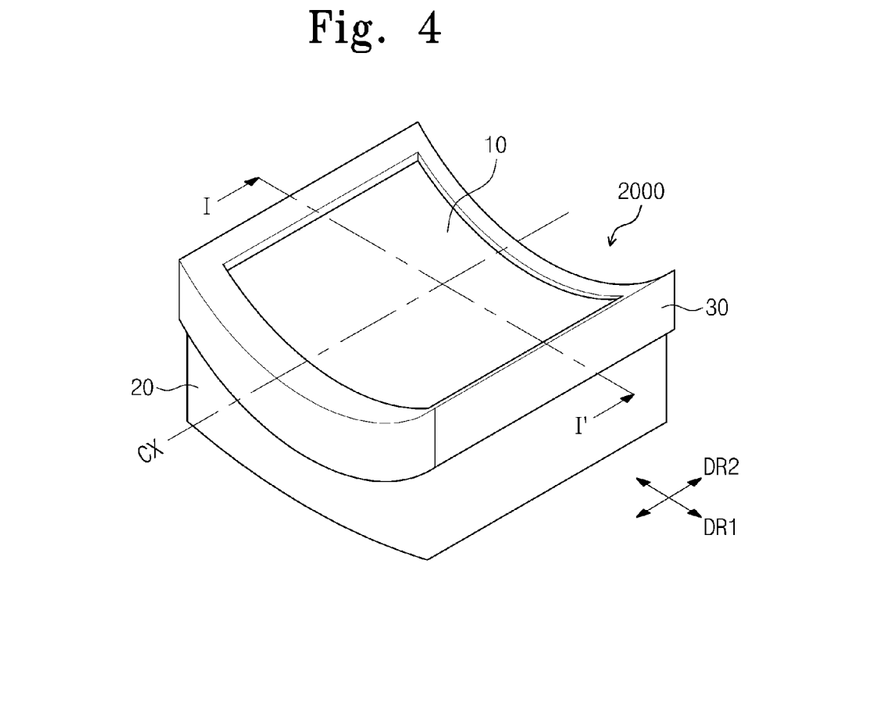
FIG. 4 is a perspective view showing another exemplary embodiment of a display device according to the invention.
Figure 5:
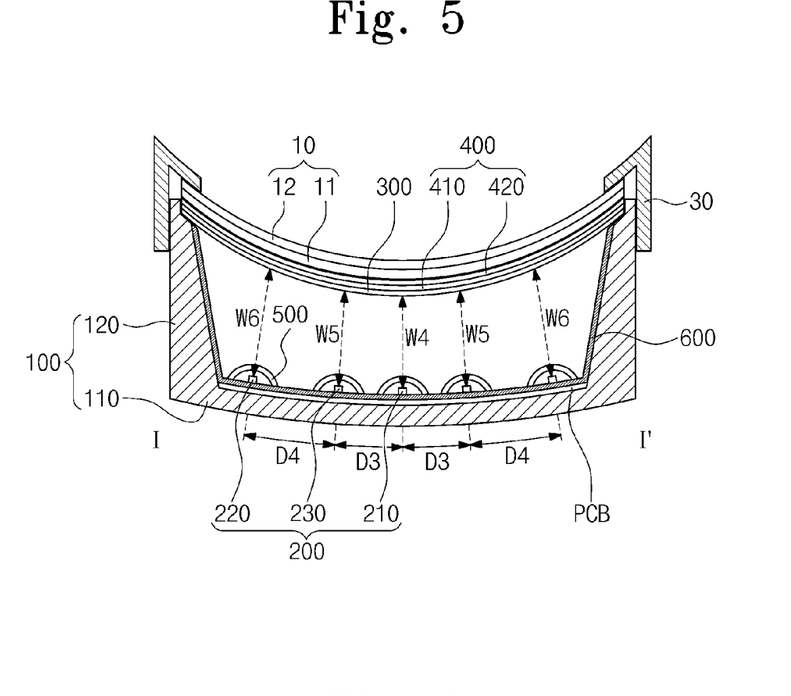
FIG. 5 is a cross-sectional view taken along line I-I' shown in FIG. 4.
Figure 6:
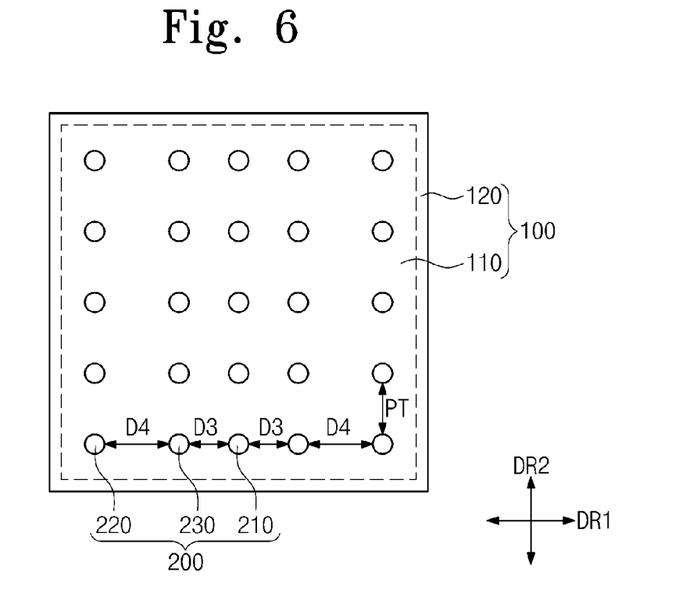
FIG. 6 is a plan view showing an exemplary embodiment of a light emitting diode and a bottom cover of a backlight unit shown in FIG. 4.

FIG. 4 is a perspective view showing another exemplary embodiment of a display device 2000 according to the invention, FIG. 5 is a cross-sectional view taken along line I-I' shown in FIG. 4, and FIG. 6 is a plan view showing an exemplary embodiment of a light emitting diode and a bottom cover of a backlight unit shown in FIG. 4.

The display device 2000 shown in FIGS. 4 to 6 has the same structure and function as those of the display device 1000 described with reference to FIGS. 1 to 3 except for the curvature of the upper and lower surfaces of the backlight unit 20.

Referring to FIGS. 4 to 6, the display device 2000 includes a display panel 10, an upper cover 30 and a backlight unit 20. Detailed descriptions of the display panel 10 and the upper cover 30 will be omitted.

The backlight unit 20 includes a bottom cover 100, a light generator such as a plurality of light emitting diodes 200, a diffusion plate 300, an optical sheet 400 and optical lenses 500.

The bottom cover 100 includes a bottom portion 110, and a sidewall 120 extending from an edge of the bottom portion 110.

The bottom portion 110 is curved to be concaved. The diffusion plate 300 has a curvature different from a curvature of the bottom portion 110. In the illustrated exemplary embodiment, the curvature of the bottom portion 110 is smaller than the curvature of the diffusion plate 300. In addition, the diffusion plate 300 is curved to be concaved similar to the bottom portion 110. Further, the diffusion plate 300 is curved to have the same curvature as that of the display panel 10.

The light emitting diodes 200 include a center light emitting diode 210 and an outer light emitting diode 220. The center light emitting diode 210 is disposed at a center portion of the bottom portion 110 in the first direction DR1. The outer light emitting diode 220 is disposed at an outer portion of the bottom portion 110 in the first direction DR1.

The light emitting diodes 200 may further include an intermediate light emitting diode 230 disposed between the center light emitting diode 210 and the outer light emitting diode 230. The intermediate light emitting diode 230 is arranged in one column, but the number of the columns in which the intermediate light emitting diode 230 is arranged should not be limited to one.

The pitch in the first direction DR1 between the light emitting diodes 200, which is measured along the surface of the bottom portion 110, is proportional to a distance between the diffusion plate 300 and the light emitting diodes 200 in the direction substantially vertical (e.g., normal) to the bottom portion 110.

Each of the center light emitting diode 210, the outer light emitting diode 220 and the intermediate light emitting diode 230 may be provided in plural (e.g., groups thereof) arranged in the second direction DR2 at regular intervals.

A distance W4 between the center light emitting diode 210 and the diffusion plate 300 in the direction substantially vertical (e.g., normal) to the bottom portion 110 at which the center light emitting diode 210 is disposed, is smaller than a width W6 between the outer light emitting diode 220 and the diffusion plate 300 in the direction substantially vertical (e.g., normal) to the bottom portion 110 at which the outer light emitting diode 220 is disposed.

The distance in the direction substantially vertical (e.g., normal) to the bottom portion 110 between the diffusion plate 300 and the light emitting diodes 200 increases, as a distance from the center light emitting diode 210 increases and a distance from the outer light emitting diode 220 decreases. In detail, the distance W4 between the center light emitting diode 210 and the diffusion plate 300 is smaller than the distance W5 between the intermediate light emitting diode 230 and the diffusion plate 300, and the distance W5 between the intermediate light emitting diode 230 and the diffusion plate 300 is smaller than the distance between the outer light emitting diode 220 and the diffusion plate 300, that is, W6>W5>W4.

A pitch D3 in the first direction DR1 between the center light emitting diode 210 and the light emitting diodes adjacent to the center light emitting diode 210 may be smaller than a pitch D4 in the first direction DR1 between the outer light emitting diode 220 and the light emitting diodes adjacent to the outer light emitting diode 220.

The pitch between the light emitting diodes in the first direction DR1 increases, as a distance from the center light emitting diode 210 increases and a distance from the outer light emitting diode 220 decreases. In more detail, the pitch D3 between the center light emitting diode 210 and the intermediate light emitting diode 230 may be smaller than the pitch D4 between the outer light emitting diode 220 and the intermediate light emitting diode 230, that is, D4>D3.

A light amount of the light emitted from the center light emitting diode 210 in a unit of time may be smaller than a light amount of the light emitted from the outer light emitting diode 220 in the unit of time.

The light amount of the light emitted from the light emitting diodes is increased as the distance from the center light emitting diode 210 increases and the distance from the outer light emitting diode 220 decreases. In detail, the light amount L4 of the light emitted from the center light emitting diode 210 is smaller than the light amount L5 of the light emitted from the intermediate light emitting diode 230, and the light amount L5 of the light emitted from the intermediate light emitting diode 230 is smaller than the light amount L6 of the light emitted from the outer light emitting diode 220, that is, L6>L5>L4.

When the distance between the light emitting diodes 200 and the diffusion plate 300 varies, a brightness difference occurs. In order to allow the brightness to be uniform over the entire are of the backlight unit 20, the light amount of the light emitted from the light emitting diodes 200 is proportional to the distance between the light emitting diodes 200 and the diffusion plate 300.

In more detail, the printed circuit board PCB may control the light amount by controlling a duty ratio of the light emitting diodes 200, an electrical current level applied to the light emitting diodes 200, or an electrical current-on time of the electrical current applied to the light emitting diodes 200. In an exemplary embodiment, for instance, the printed circuit board PCB may control the light amount of the light emitted from the light emitting diodes 200 to allow the duty ratio of the center light emitting diode 210 to be relatively small and the duty ratio of the outer light emitting diode 220 to be relatively large.

Figure 7:
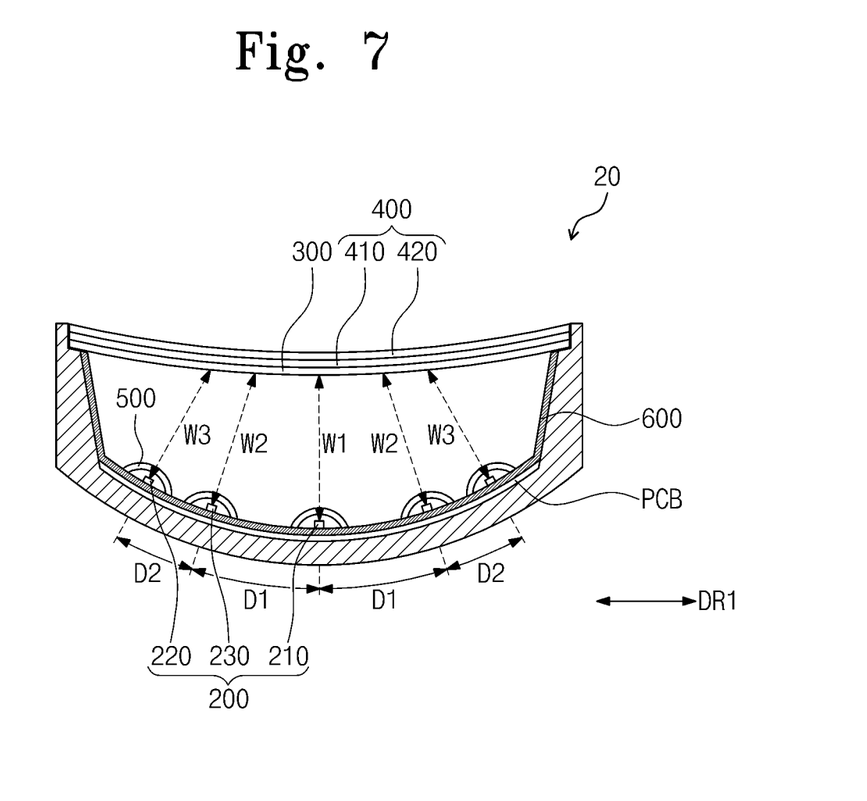
FIG. 7 is a cross-sectional view showing an exemplary embodiment of a backlight unit according to the invention.

FIG. 7 is a cross-sectional view showing an exemplary embodiment of a backlight unit according to the invention.

The backlight unit shown in FIG. 7 is substantially the same as the backlight unit shown in FIGS. 1 to 3 or 4 to 6, and thus details thereof will be omitted. The view in FIG. 7 shows just the backlight unit 20 of FIGS. 1 to 3 or 4 to 6 and omits the display panel 10 and the upper cover 30 of the respective display device.

Figure 8:
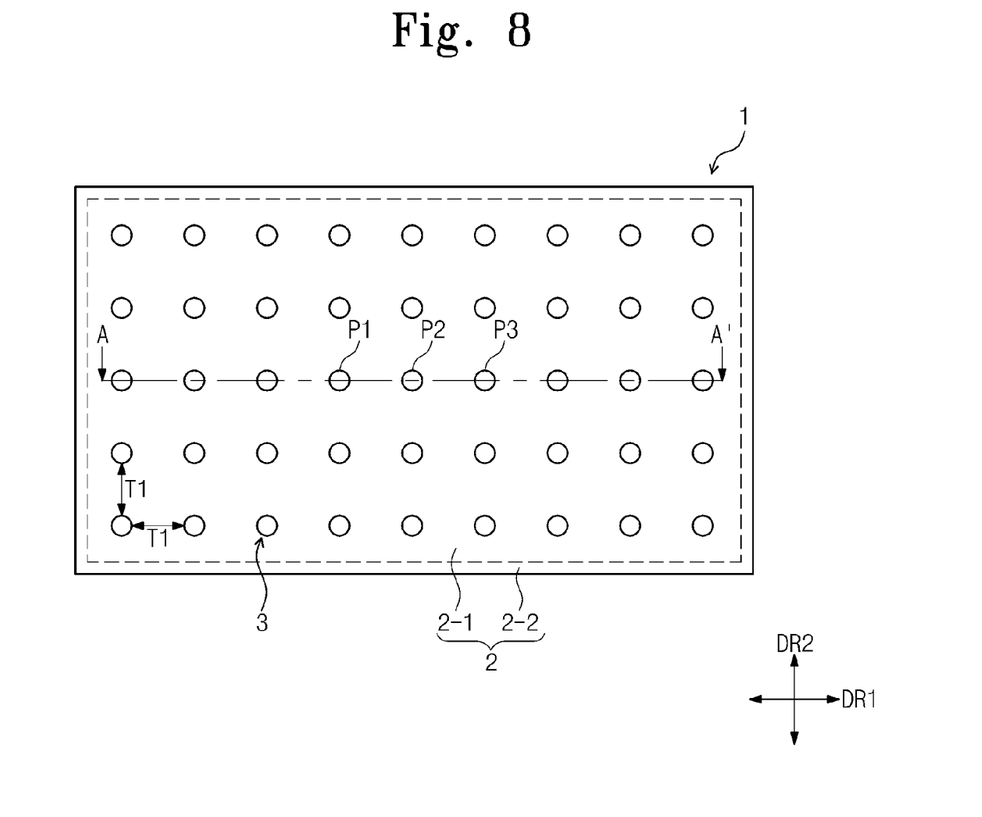
FIG. 8 is a plan view showing a comparative example of a light emitting diode and a bottom cover of a backlight unit.
Figure 9:
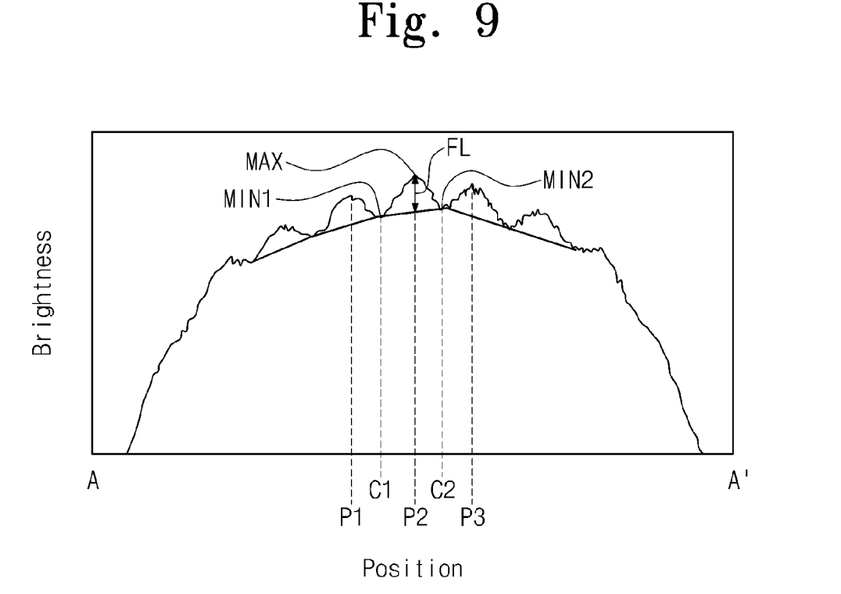
FIG. 9 is a graph relatively showing a brightness as a function of positions on A-A' of the backlight unit shown in FIG. 8.
Figure 10:
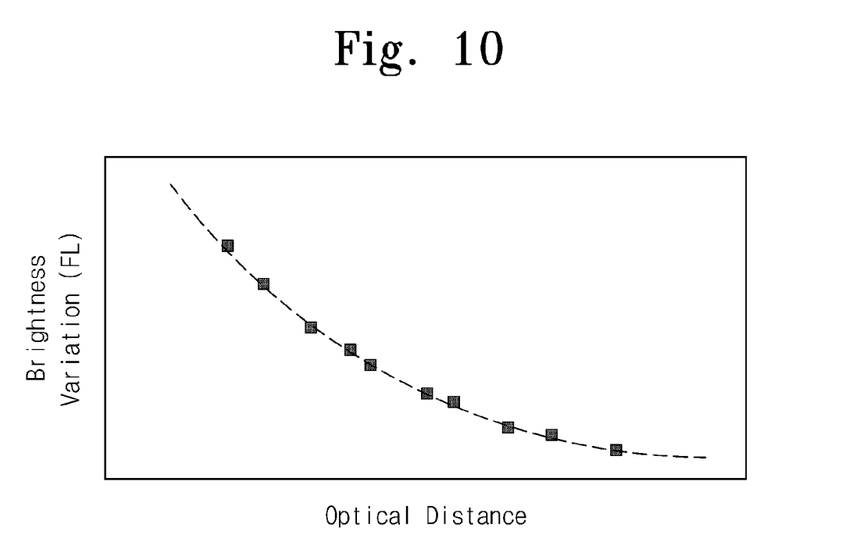
FIG. 10 is a graph relatively showing a uniformity of brightness according to an optical distance.

FIG. 8 is a plan view showing a light emitting diode and a bottom cover of a backlight unit according to a comparative example, FIG. 9 is a graph relatively showing a brightness as a function of positions on A-A' of the backlight unit shown in FIG. 8, and FIG. 10 is a graph explaining relative uniformity of brightness according to an optical distance.

Referring to FIG. 8, a backlight unit 1 includes a bottom cover 2 and a plurality of light emitting diodes 3. The backlight unit 1 includes an upper surface and a lower surface, which are flat. The light emitting diodes 3 are disposed at the same optical distance, e.g., a distance between each light emitting diode and the diffusion plate.

The bottom cover 2 includes a bottom portion 2-1, and a sidewall 2-2 extending from an edge of the bottom portion 2-1. The bottom portion 2-1 is flat.

The light emitting diodes 3 are arranged on the bottom portion 2-1. The light emitting diodes 3 have a constant pitch Ti in first and second directions DR1 and DR2.

Referring to FIGS. 8 and 9, the backlight unit 1 according to the comparative example has peak brightness at positions, at which the light emitting diodes 3 are located, and has brightness between the light emitting diodes 3, which is lower than the peak brightness.

First, second and third light emitting diodes P1, P2 and P3 will be described with reference to FIG. 8 as representative examples.

The backlight unit 1 has the peak brightness at positions at which the first, second and third light emitting diodes P1, P2 and P3 are located, respectively. The backlight unit 1 has a maximum peak brightness MAX at the position at which the second light emitting diode P2 is located. In addition, the backlight unit 1 has a first minimum peak brightness MIN1 at a first intermediate position C1 between the first light emitting diode P1 and the second light emitting diode P2, and a second minimum peak brightness MIN2 at a second intermediate position C2 between the second light emitting diode P2 and the third light emitting diode P3.

A difference between the maximum peak brightness MAX and a line connected between the first minimum peak brightness MIN1 and the second minimum peak brightness MIN2 is referred to as a brightness variation FL.

Referring to FIG. 10, the brightness variation FL is decreased as the optical distance of the light emitting diodes increases. In addition, the uniformity of the backlight unit is improved as the brightness variation FL is reduced.

The brightness variation FL is reduced as the pitch in the first direction DR1 between the light emitting diodes 3 decreases. In other words, the brightness variation FL is increased as the pitch in the first direction DR1 between the light emitting diodes 3 is decreased.

In FIGS. 8 and 9, when the pitch in the first direction DR1 between the first light emitting diode P1 and the second light emitting diode P2 decreases, the first minimum peak brightness MIN1 of the first intermediate position C1 is increased by influence of the first and second light emitting diodes P1 and P2. The increase of the brightness of the maximum peak brightness MAX at the position at which the second light emitting diode P2 is located is relatively smaller than the increase of the first minimum peak brightness MIN1.

As described with reference to FIGS. 8 to 10, the brightness variation FL of the backlight unit is decreased as the optical distance is increased, and increased as the pitch of the light emitting diodes is increased.

In order to uniformly maintain the brightness variation FL, e.g., the brightness uniformity of the backlight unit, the pitch of the light emitting diodes is defined to be proportional to the optical distance of the light emitting diodes.

Although one or more exemplary embodiment of the invention has been described, it is understood that the invention should not be limited to these exemplary embodiments but various changes and modifications can be made by one ordinary skilled in the art within the spirit and scope of the invention as hereinafter claimed.

What is claimed is:
1. A display device comprising:
  a display panel curved along a first direction, and configured to display an image; and
  a backlight unit configured to provide a light to the display panel, the backlight unit comprising:
    a bottom cover comprising:
      a bottom portion which is curved along the first direction, and
      a sidewall which extends from the bottom portion;
    a plurality of light emitting diodes on the bottom portion and configured to generate the light; and
    a diffusion plate on an upper end of the sidewall and curved along the first direction,
    wherein
    a curvature of the bottom portion is larger than a curvature of the diffusion plate, and
    in the first direction along the curvature of the bottom portion, as a distance from a center portion of the bottom portion to an outer portion of the bottom portion increases,
      pitches between the light emitting diodes decrease, and
      for the light emitting diodes for which pitches therebetween decrease, distances between the light emitting diodes and the diffusion plate in a direction substantially normal to positions of the bottom portion at which the light emitting diodes decrease.

2. The display device of claim 1, wherein the light emitting diodes comprise:
  a center light emitting diode at the center portion of the bottom portion in the first direction, and
  an outer light emitting diode at the outer portion of the bottom portion in the first direction.

3. The display device of claim 2, wherein the distance between the center light emitting diode and the diffusion plate in the direction substantially normal to the position of the bottom portion at which the center light emitting diode is disposed, is greater than the distance between the outer light emitting diode and the diffusion plate in the direction substantially normal to the position of the bottom portion at which the outer light emitting diode is disposed.

4. The display device of claim 3, wherein an amount of the light emitted from the center light emitting diode in a unit of time is greater than an amount of the light emitted from the outer light emitting diode in the unit of time.

5. The display device of claim 2, wherein the pitch in the first direction between the center light emitting diode and the light emitting diode adjacent to the center light emitting diode, is greater than the pitch in the first direction between the outer light emitting diode and the light emitting diode adjacent to the outer light emitting diode.

6. The display device of claim 1, wherein a curvature of a lower surface of the display panel is substantially the same as a curvature of an upper surface of the backlight unit which is defined by the diffusion plate.

7. The display device of claim 1, further comprising an upper cover covering an edge of the display panel and coupled to the backlight unit, and an opening defined in the upper cover to expose a portion of an upper surface of the display panel.

8. The display device of claim 1, wherein the backlight unit further comprises a plurality of optical lenses respectively covering the light emitting diodes and configured to improve an optical illumination angle of the light emitting diodes.

9. The display device of claim 1, wherein the backlight unit further comprises an optical sheet between the diffusion plate and the display panel.

10. A display device comprising:
  a display panel curved along a first direction, and configured to display an image; and
  a backlight unit configured to provide a light to the display panel, the backlight unit comprising:
    a bottom cover comprising:
      a bottom portion which is curved along the first direction, and
      a sidewall which extends from the bottom portion;
    a plurality of light emitting diodes on the bottom portion and configured to generate the light; and
    a diffusion plate on an upper end of the sidewall and curved along the first direction,
    wherein
    a curvature of the bottom portion of the bottom cover is smaller than ache curvature of the diffusion plate, and
    in the first direction along the curvature of the bottom portion, as a distance from a center portion of the bottom portion to an outer portion of the bottom portion increases, pitches between the light emitting diodes increase, and for the light emitting diodes for which pitches therebetween increase, distances between the light emitting diodes and the diffusion plate in a direction substantially normal to positions of the bottom portion at which the light emitting diodes increase.

11. The display device of claim 10, wherein the light emitting diodes comprise:
a center light emitting diode at the center portion of the bottom portion in the first direction, and
an outer light emitting diode at the outer portion of the bottom portion in the first direction.

12. The display device of claim 11, wherein the distance between the center light emitting diode and the diffusion plate in the direction substantially normal to the position of the bottom portion at which the center light emitting diode is disposed, is smaller than the distance between the outer light emitting diode and the diffusion plate in the direction substantially normal to the position of the bottom portion at which the outer light emitting diode is disposed.

13. The display device of claim 11, wherein the pitch in the first direction between the center light emitting diode and the light emitting diode adjacent to the center light emitting diode, is smaller than the pitch in the first direction between the outer light emitting diode and the light emitting diode adjacent to the outer light emitting diode.

14. The display device of claim 12, wherein an amount of the light emitted from the center light emitting diode in a unit of time is smaller than an amount of the light emitted from the outer light emitting diode in the unit of time.

15. The display device of claim 10, wherein a curvature of a lower surface of the display panel is substantially the same as a curvature of an upper surface of the backlight unit which is defined by the diffusion plate.

16. The display device of claim 10, further comprising an upper cover covering an edge of the display panel and coupled to the backlight unit, and an opening defined in the upper cover to expose a portion of an upper surface of the display panel.

17. The display device of claim 10, wherein the backlight unit further comprises a plurality of optical lenses respectively covering the light emitting diodes and configured to improve an optical illumination angle of the light emitting diodes.

18. The display device of claim 10, wherein the backlight unit further comprises an optical sheet between the diffusion plate and the display panel.

\* \* \* \* \*